M. A. TWITCHELL.
ANIMAL TRAP.
APPLICATION FILED FEB. 27, 1917.

1,241,058. Patented Sept. 25, 1917.

INVENTOR
M. A. TWITCHELL
BY
Milton B. Crandall
ATTORNEY

UNITED STATES PATENT OFFICE.

MYRON A. TWITCHELL, OF ELK POINT, SOUTH DAKOTA, ASSIGNOR TO CHAUNCEY C. CRANDALL, OF SIOUX FALLS, SOUTH DAKOTA, AND BUEL COUCH AND MILTON S. CRANDALL, BOTH OF SIOUX CITY, IOWA.

ANIMAL-TRAP.

1,241,058.  Specification of Letters Patent.  Patented Sept. 25, 1917.

Application filed February 27, 1917. Serial No. 151,205.

*To all whom it may concern:*

Be it known that I, MYRON A. TWITCHELL, a citizen of the United States, and a resident of Elk Point, in the county of Union and State of South Dakota, have invented certain new and useful Improvements in Animal-Traps, of which the following is a specification.

The present invention relates to animal traps and more particularly to traps for mice and rats.

The invention has for its primary object the production of an improved animal trap of the spring-jaw type, embodying certain novel features of construction and arrangements of parts whereby the animals are sure to be caught regardless of which way they enter the trap.

Another object of the invention is the production of an improved animal trap inexpensive in manufacture yet thoroughly efficient and dependable in operation.

Still another object of the invention is the production of a spring-jaw animal trap which can be readily set without danger of entrapping the hands or fingers.

Furthermore, the invention contemplates an animal trap of the spring-jaw type which may be readily adjusted to render it more or less sensitive.

With these and other objects in view, the invention consisting in the construction, combination and novel arrangement of parts will be fully understood from the following description, reference being had to the accompanying drawings, which form a part of this application and in which like characters of reference indicate corresponding parts throughout the several views, of which:

Although, I have illustrated and hereinafter described the preferred embodiment of the invention, I would not be understood as being limited to the specific structure chosen for illustration for various alterations and modifications may be made in the details of construction and arrangement of parts, without departing from the spirit and scope of the invention as defined in the appended claims.

The invention contemplates, broadly, a trap consisting of two jaws which are pivoted on the base to swing in opposite directions. The upper portion of one jaw slidably engages the companion jaw whereby the jaws operate in unison. Spring mechanism is provided which tends to close the jaws against the base. The jaws are held releasably in open position by means of a bait-holding trigger.

Referring, now, to the illustrations, 8 is the base of the trap which may be of any suitable material and construction but preferably consisting of a sheet metal plate having downwardly extending side and end flanges, 9, which support the plate in spaced relation to the surface on which the trap is placed. The intermediate portion of the plate is provided with an opening, 10, and the plate at the sides of said opening is formed with downwardly extending flanges 11. The jaws 12, and 13, are substantially U-shaped.

The ends of the jaw 12, are bent inwardly and pivoted in suitable bearings adjacent one end of the plate, as in loops, 14 punched upwardly from the plate. The jaw, 13, consists preferably, of an endless wire, the ends of which are welded together, as at 15 or otherwise suitably joined. The lower end, 18, of the jaw, 13, extends across the plate and opening, 10 and is pivoted in bearings 16, punched from the plate. The jaw, 13, is somewhat wider than the companion jaw and the upper portion of its sides are bent inwardly to form loops, 17, which inclose and slidably engage the side members of the companion jaw. The side members of the jaw, 12, are curved slightly in order that when the trap is sprung the said jaw will clear the loop portions and the lower ends of the jaw, 13, and thus permit the upper end of the jaw, 12, to impinge the base.

Figure 5:
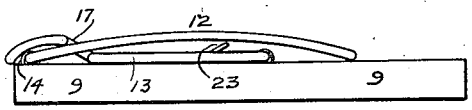
Fig. 5 is a side elevation of the same in sprung position.

The loop members, 17, are offset at an angle as shown in Fig. 5 and the portions of the side members of the jaw are curved so that the upper end of the jaw is in substantially the same plane as the portion of the jaw below the looped portion. The lower member, 18, of the jaw, 13, is formed with a crank, 19, which extends substantially at right angles to the plane of the jaw and operates freely within the opening, 10. The wrist of the crank is preferably formed with an offset to which is secured one end of a retracting spring 20, the opposite end of which is secured to an ear, 21, depending from the plate and adjacent the end thereof.

Figure 3:
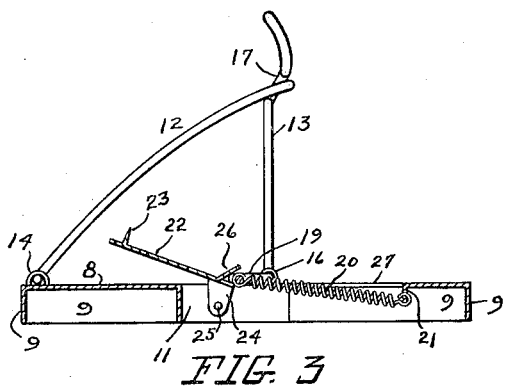
Fig. 3 is a vertical section of the same.
Figure 4:
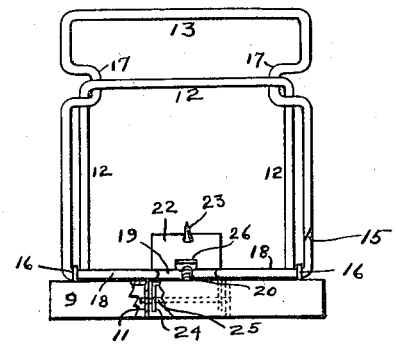
Fig. 4 is an end elevation of the same, the base being cut away.
Figure 7:
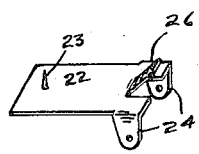
Fig. 7 is a perspective view of the trigger.

The trigger consists of a plate, 22, which may be provided adjacent one end with a barb, 23, on which to place the bait. At its opposite end the plate is provided with ears, 24, which depend from the sides of the plate and between the flanges, 11. The ears are pivoted on a rod, 25, which passes through the flanges, 11, and the ears, 24. When the trigger is raised as clearly shown in Fig. 3 the pivoted end of the trigger engages the under side of the crank and thus holds the jaws open. The intermediate portion of the pivoted end of the trigger is sheared and bent upwardly to form an ear, 26, which engages the crank to prevent upward movement of the trigger and also serves as means for adjusting the sensitiveness of the trap. That is, by bending the ear, 26, upwardly, the plate 22, may be farther raised and extended well under the crank in which position the trigger will endure considerable pressure without releasing the crank, while if the ear is bent downwardly it is evident that the crank will be engaged near the end of the trigger and will be released much more easily.

Figure 1:
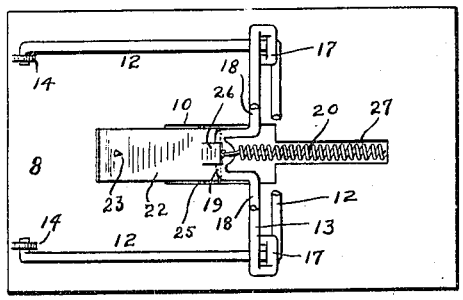
Figure 1 is a plan of a trap constructed in accordance with the invention, a portion thereof, being cut away.
Figure 6:
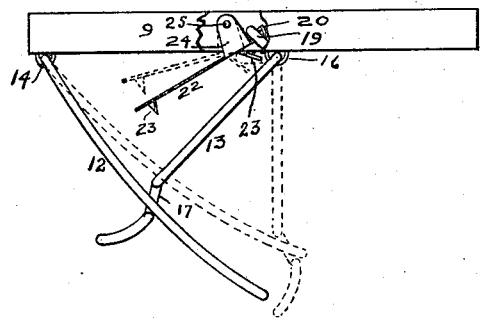
Fig. 6 is an inverted side elevation of the same, the base being cut away.
Figure 2:
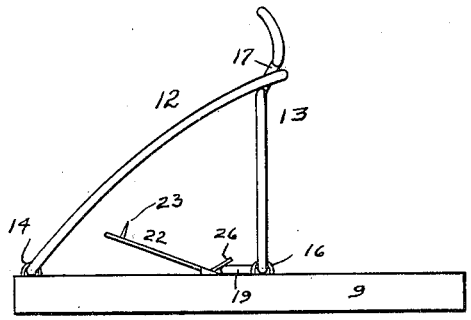
Fig. 2 is a side elevation of the same.

In setting the trap it may be held in an inverted position as shown in Fig. 6, and while thus held the operator grasps the free end of the jaw, 13, and pulls it downwardly, as shown, during which movement the trigger hangs downwardly and its supporting ears are engaged by the crank. Then as the jaws are drawn to the position shown in dotted lines the crank co-acts with the ears to raise the trigger until the crank is engaged with the ear or stop, 26. The trap may also be set without being inverted and without danger of entrapping the fingers by supporting the base in one hand and yieldably engaging the underside of the trigger through the opening, 10 with the finger while the jaws are being drawn open and until the crank is engaged by the trigger.

The base may be slotted as at 27, to prevent obstruction of the spring, 20. It is now evident that when the trigger, 22, is depressed by the animal that the latter will be impinged between one or the other of the jaws, and the base, depending on the direction from which it approaches the bait.

Obviously, if a single jaw trap is desired, the jaw 12, may be omitted. This construction affords an improved single jaw trap due to convenience and safety in setting and its adjustable trigger mechanism.

Having thus described my invention what I claim as new and desire to secure by Letters Patent is,

1. An animal trap including a base, a jaw having a lower cross member provided with an intermediate crank and pivoted on the base to permit the jaw to be swung upwardly and downwardly to accordingly open and close, a spring acting on the crank to force the jaw closed, a trigger pivoted on the base to engage the crank to hold the jaw releasably open, and a stop on the trigger to engage the crank, the stop being adjustable to regulate the sensitiveness of the trigger.

2. An animal trap comprising a base, two jaws pivoted thereon to swing downwardly toward each other to close against the base, and upwardly from each other to open, a crank arm on one of the jaws, one of the jaws having a part slidably engaging the other jaw to cause the jaws to operate in unison, a spring between the crank and base to force the jaws closed, and a trigger pivoted on the base to releasably engage the crank to hold the jaws open.

3. An animal trap including a base, a jaw having a lower cross-member pivoted on the base to permit the jaw to be swung upwardly and downwardly to accordingly open and close, a crank-arm on the cross-member, a spring acting on the crank to force the jaw closed, and a trigger including a plate pivoted adjacent one end on the base and adapted to engage at its pivoted end the under side of the crank arm to hold the jaw releasably open, and an inclined ear on the plate engageable with the end of the crank-arm and adjustable to regulate the sensitiveness of the trigger.

4. An animal trap comprising a base, a substantially U-shaped jaw having the ends of its arms pivoted adjacent one end of the base, a second jaw substantially rectangular and having its lower end pivoted to the intermediate portion of the base and formed with a crank, the base having an opening to receive the crank and the sides of said second jaw being provided with loops slidably inclosing the sides of said first jaw whereby the jaws swing in unison downwardly toward each other to close against the base, and upwardly from each other to open, a retracting spring between the crank and base to close the jaws and a trigger including a bait-holding member pivoted adjacent one end within the opening and engageable at its pivoted end with the crank to hold the jaws open and adapted when depressed at its free end to disengage the crank.

5. An animal trap comprising a base, a substantially U-shaped jaw having the ends of its arms pivoted adjacent one end of the base, a second jaw substantially rectangular and having its lower end pivoted to the intermediate portion of the base and formed with a crank, the base having an opening to receive the crank, and the sides of said second jaw being provided with loops slidably engaging the sides of said first jaw, whereby the jaws swing in unison downwardly toward each other to close against the base, and upwardly from each other to open, a retracting spring between the crank and the base to close the jaws, and a trigger including a bait-holding plate pivoted adjacent one end within the opening and engageable at its pivoted end with the under side of the crank wrist to hold the jaws open and adapted when depressed at its free end to disengage the crank, and an ear extending upwardly from the plate to engage the crank.

In testimony whereof, I have hereunto set my hand this 24th day of February, 1917.

MYRON A. TWITCHELL.